(12) United States Patent
Mendenhall (10) Patent No.: US 7,547,066 B2
(45) Date of Patent: Jun. 16, 2009

(54) JUVENILE VEHICLE SEAT WITH FORWARD-FOLDING HEADREST AND REARWARD-FOLDING FOUNDATION

(75) Inventor: Andrew B. Mendenhall, Mooresville, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 12/105,780

(22) Filed: Apr. 18, 2008

(65) Prior Publication Data
US 2008/0258525 A1 Oct. 23, 2008

Related U.S. Application Data (60) Provisional application No. 60/913,171, filed on Apr. 20, 2007.

(51) Int. Cl.
*B60N 2/28* (2006.01)
(52) U.S. Cl. ............... 297/250.1; 297/16.1; 297/378.12
(58) Field of Classification Search ............. 297/16.1, 297/17, 250.1, 378.1, 378.12, 408
See application file for complete search history.

(56) References Cited

U.S. PATENT DOCUMENTS

| | | | |
|---|---|---|---|
| 1,641,953 A | 9/1927 | Abraham | |
| 1,742,822 A | 1/1930 | Olson | |
| 3,404,915 A * | 10/1968 | De Souza Filho | 297/17 |
| 3,762,768 A | 10/1973 | Hyde et al. | |
| 4,234,228 A * | 11/1980 | Flamm | 297/464 |
| 4,274,674 A * | 6/1981 | Deloustal | 297/256.13 |
| 4,440,331 A * | 4/1984 | Schimmels | 297/130 |
| 4,500,133 A * | 2/1985 | Nakao et al. | 297/131 |
| 4,641,884 A * | 2/1987 | Miyashita et al. | 297/284.1 |
| 4,728,119 A * | 3/1988 | Sigafoo | 280/657 |
| 4,902,070 A * | 2/1990 | Casale et al. | 297/238 |
| 4,986,600 A | 1/1991 | Leblanc et al. | |
| 5,106,154 A * | 4/1992 | Kain | 297/256.14 |
| 5,121,961 A * | 6/1992 | Marshall | 297/17 |
| 5,121,965 A | 6/1992 | Skold et al. | |
| 5,447,356 A * | 9/1995 | Snijders | 297/284.3 |
| 5,496,092 A | 3/1996 | Williams et al. | |
| 5,499,860 A | 3/1996 | Smith et al. | |
| 5,647,634 A | 7/1997 | Presser et al. | |
| 5,785,383 A | 7/1998 | Otero | |
| 5,803,543 A | 9/1998 | Hartmann | |
| 6,179,362 B1 | 1/2001 | Wisniewski et al. | |
| 6,767,058 B2 | 7/2004 | McClellan-Derrickson | |
| 6,773,064 B2 | 8/2004 | Tren et al. | |
| 6,840,577 B2 | 1/2005 | Watkins | |
| 6,908,151 B2 | 6/2005 | Meeker et al. | |
| 6,932,429 B2 | 8/2005 | Kamiki | |
| 7,000,985 B2 | 2/2006 | Belgarde | |
| 2004/0061366 A1 | 4/2004 | Meeker et al. | |
| 2004/0124677 A1 | 7/2004 | Meeker et al. | |
| 2005/0052059 A1 | 3/2005 | Oto | |
| 2005/0186068 A1 | 8/2005 | Coulson et al. | |
| 2005/0264059 A1 | 12/2005 | Clement et al. | |
| 2005/0264065 A1 | 12/2005 | Clement et al. | |
| 2006/0006712 A1 | 1/2006 | Clement et al. | |
| 2006/0012234 A1 | 1/2006 | Collias | |
| 2006/0138823 A1 | 6/2006 | Huang | |
| 2007/0236061 A1 | 10/2007 | Meeker et al. | |

* cited by examiner

*Primary Examiner*—Peter R. Brown
(74) *Attorney, Agent, or Firm*—Barnes & Thornburg LLP (57) ABSTRACT

A juvenile vehicle seat includes a seat base, a foldable headrest, and a foundation including a leg rest.

19 Claims, 6 Drawing Sheets

FIG. 3

FIG. 7
FIG. 9
FIG. 8
FIG. 10

JUVENILE VEHICLE SEAT WITH FORWARD-FOLDING HEADREST AND REARWARD-FOLDING FOUNDATION

This application claims priority under 35 U.S.C. § 119(e) to U.S. Provisional Application Ser. No. 60/913,171, filed Apr. 20, 2007, which is expressly incorporated by reference herein.

BACKGROUND

The present disclosure relates to juvenile vehicle seats, and in particular to vehicle seats. More particularly, the present disclosure relates to a foldable juvenile vehicle seat.

SUMMARY

A juvenile vehicle seat in accordance with the present disclosure includes a stationary seat base, a headrest, and a foundation. The headrest is coupled to an upper portion of the seat base while the foundation is coupled to a lower portion of the seat base.

In illustrative embodiments, the seat also includes headrest and foundation folders that can be operated by a caregiver to convert the juvenile vehicle seat from a juvenile-seating mode to a seat-storing mode by folding the headrest forwardly and folding the foundation rearwardly. The headrest includes a head support and the foundation includes a leg rest.

In illustrative embodiments, the headrest folder locks the headrest relative to the seat base. Operation of the headrest folder by a caregiver releases the headrest so that it is free to be rotated in a forward counterclockwise direction relative to the seat base to move from an upright use position to a compact folded storage position. The foundation folder locks the foundation relative to the seat base. Operation of the foundation folder by a caregiver releases the foundation so that it is free to be rotated in a rearward clockwise direction relative to the seat base to move from an extended use position to a compact folded storage position.

In illustrative embodiments, the headrest folder includes a first headrest-pivot controller on the left side of the headrest and a second headrest-pivot controller on the right side of the headrest. The first and second headrest-pivot controllers couple the headrest to the seat base. Through the use of keys, receiving slots in the headrest, and openings in the seat base, the first and second headrest-pivot controllers provide the ability to lock and release the headrest relative to the seat base. Once released, the caregiver can pivot the headrest about an upper pivot axis forwardly in a counter-clockwise direction for storage.

In illustrative embodiments, the foundation folder includes a first foundation-pivot controller on the left side of the foundation and a second foundation-pivot controller on the right side of the foundation. The first and second foundation-pivot controllers couple the foundation to the seat base. Through the use of keys, receiving slots in the foundation, and openings in the seat base, the first and second foundation-pivot controllers provide the ability to lock and release the foundation relative to the seat base. Once released, the caregiver can pivot the foundation and its leg rest about a lower pivot axis rearwardly in a clockwise direction for storage.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
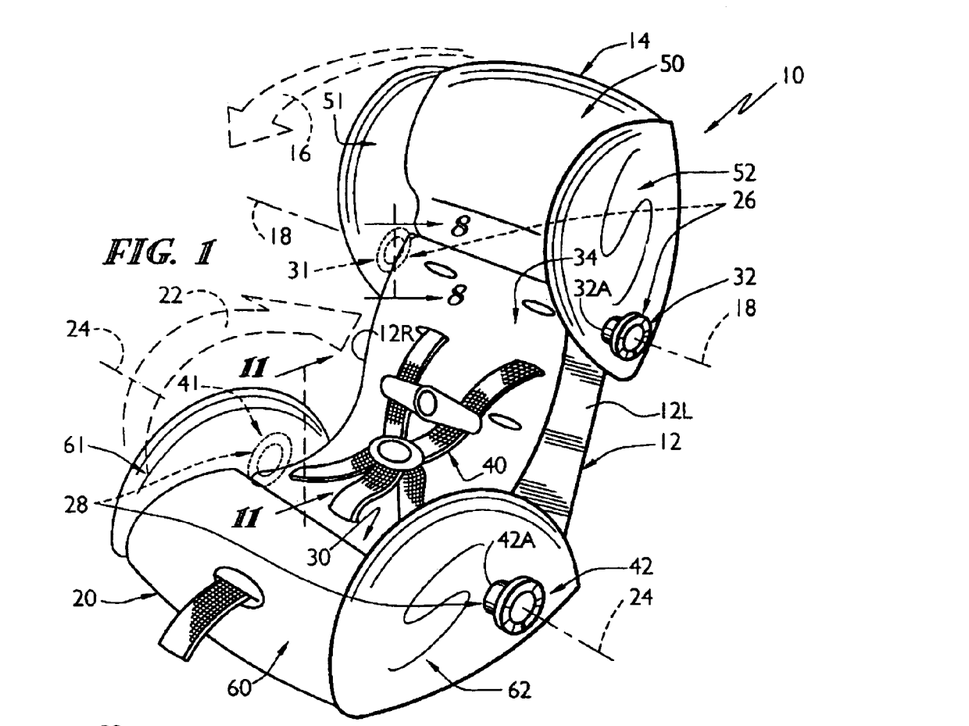
FIG. 1 is a perspective view of a juvenile vehicle seat in a juvenile-seating mode showing that the juvenile vehicle seat includes a seat base formed to include a seat bottom and a seat back, a juvenile-restraint harness coupled to the seat base, a foldable headrest mounted on the seat back for pivotable movement about a upper pivot axis, and a foldable foundation formed to include a leg rest and mounted on the seat bottom for pivotable movement about a lower pivot axis.
Figure 2:
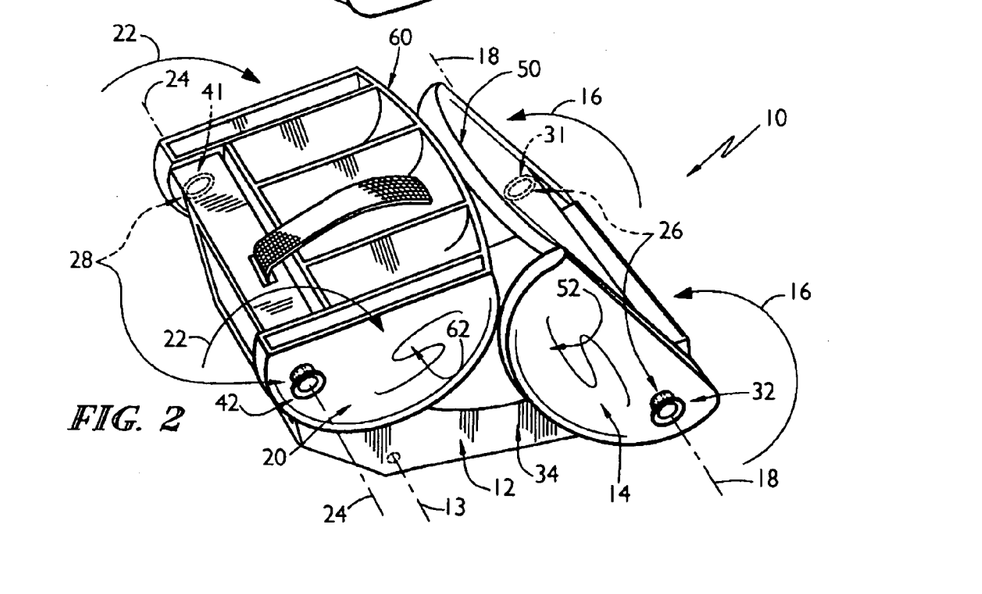
FIG. 2 is a perspective view showing the juvenile vehicle seat of FIG. 1 in a seat-storing mode after forward folding movement of the headrest relative to the seat base about the upper pivot axis in a counterclockwise direction and rearward folding movement of the foundation providing the leg rest relative to the seat base about the lower pivot axis in a clockwise direction.
Figure 4:
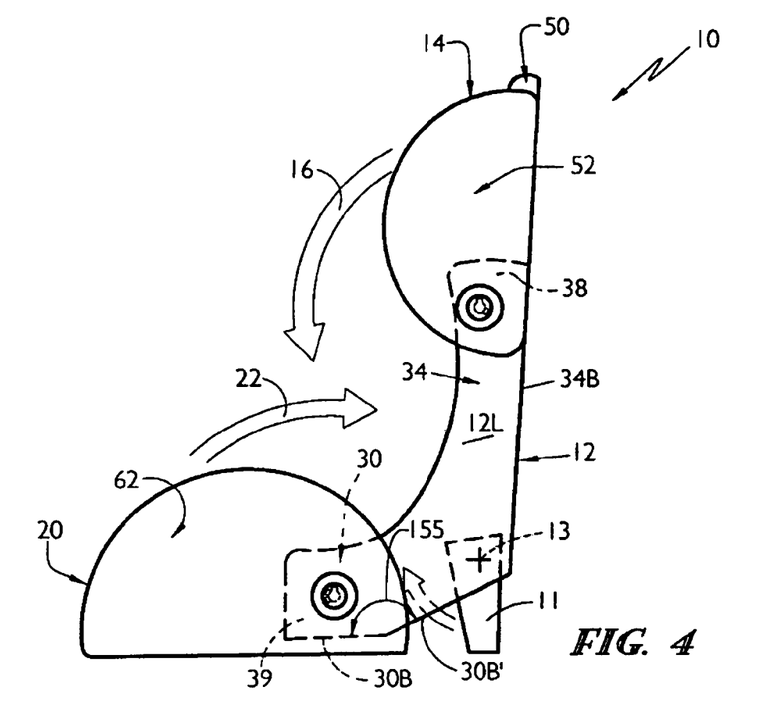
FIG. 4 is a side elevation view of the juvenile vehicle seat of FIG. 1 illustrating an upright first juvenile-seating mode of that seat in which the seat base has been rotated about a central horizontal axis in a counterclockwise direction to assume an upright position and a kickstand included in the juvenile vehicle seat and mounted for pivotable movement on a rear portion of the seat base is kicked to an opened position to support the base in a substantially upright position.
Figure 5:
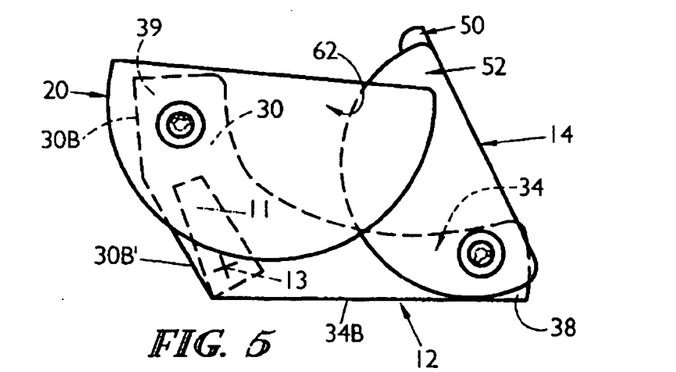
FIG. 5 is a side elevation view of the juvenile vehicle seat after it has been folded (in a manner suggested by the two double arrows provided in FIG. 4) to assume the seat-storing mode shown in FIG. 2 wherein the headrest lies in a compact folded storage position and nests partly in a space provided between two thigh supports included in the foundation and the kickstand lies in a retracted position alongside a rear portion of the seat base in, for example, a kickstand chamber formed in the seat base.

A foldable juvenile vehicle seat 10 can be unfolded to assume a juvenile-seating mode as suggested in FIGS. 1 and 4 or folded to assume a seat-storing mode as suggested in FIGS. 2 and 5. A kickstand 11 is extended and used in an upright first juvenile seating mode shown in FIG. 4 and kickstand 11 is retracted as suggested in FIG. 6 to establish a reclined second juvenile seating mode of juvenile vehicle seat 10. An illustrative headrest axle and anchor system is shown in FIGS. 7-13.

Juvenile vehicle seat 10 includes a seat base 12, a foldable headrest 14 mounted for folding movement in counterclockwise forward direction 16 about an upper pivot axis 18 relative to seat base 12, and a foldable foundation 20 including a leg rest 60 mounted for folding movement in clockwise rearward direction 22 about a lower pivot axis 24 relative to seat base 12 as suggested in FIG. 1. In use, headrest 14 and foundation 20 can be unfolded relative to seat base 12 to establish a juvenile-seating mode of juvenile vehicle seat 10 as shown, for example, in FIG. 1. Headrest 14 and foundation 20 can be folded relative to seat base 12 to establish a seat-storing mode of juvenile vehicle seat 10 as shown, for example, in FIG. 2.

Juvenile vehicle seat 10 also includes a headrest folder 26 coupled to seat base 12 and headrest 14 and a foundation folder 28 coupled to seat base 12 and foundation 20 as suggested in FIG. 1. Headrest folder 26 is configured to provide an axle establishing upper pivot axis 18. Foundation folder 28 is configured to provide another axle establishing lower pivot axis 24.

Headrest and foundation folders can be locked in the positions shown in FIGS. 1 and 2 at the option of a user. In illustrative embodiments, headrest folder 26 is also configured to provide headrest-lock means for temporarily retaining headrest 14 in fixed relation to seat base 12 in either an upright use position shown, for example, in FIG. 1 or a compact folded storage position shown, for example, in FIG. 2. In illustrative embodiments, foundation folder 28 is also configured to provide foundation-lock means for temporarily retaining foundation 20 in fixed relation to seat base 12 in either an extended use position shown, for example in FIG. 1 or a compact folded storage position shown, for example, in FIG. 2.

Figure 3:
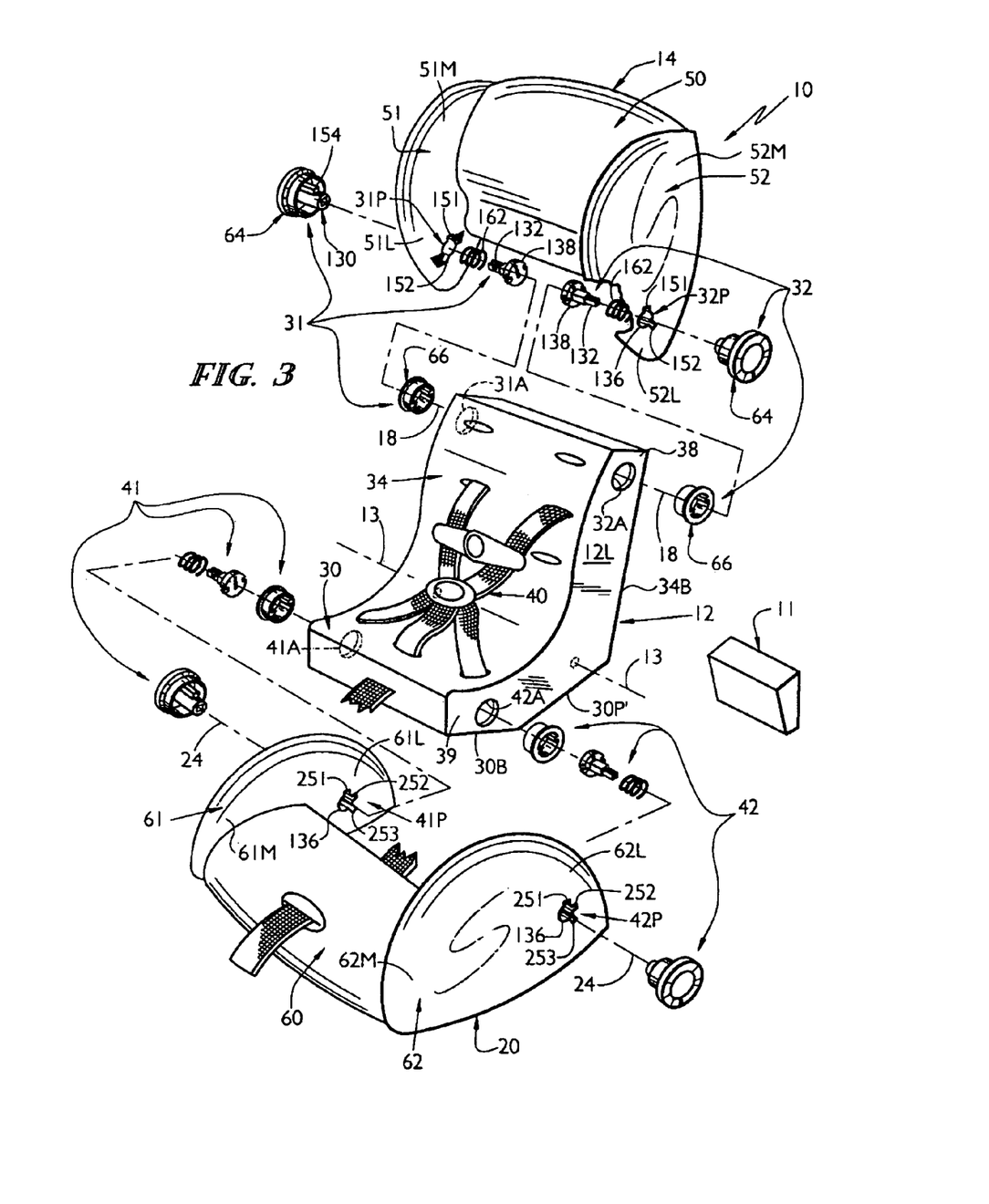
FIG. 3 is an exploded perspective assembly view of the juvenile vehicle seat of FIGS. 1 and 2 showing components included in a headrest folder that cooperate to provide a first headrest-pivot controller associated with a first side wing in the headrest and a second headrest-pivot controller associated with a second side wing in the headrest and also showing components included in a foundation folder that cooperate to provide a first foundation-pivot controller associated with a first thigh support in the foundation and a second foundation-pivot controller associated with a second thigh support in the foundation.
Figures 7, 9:
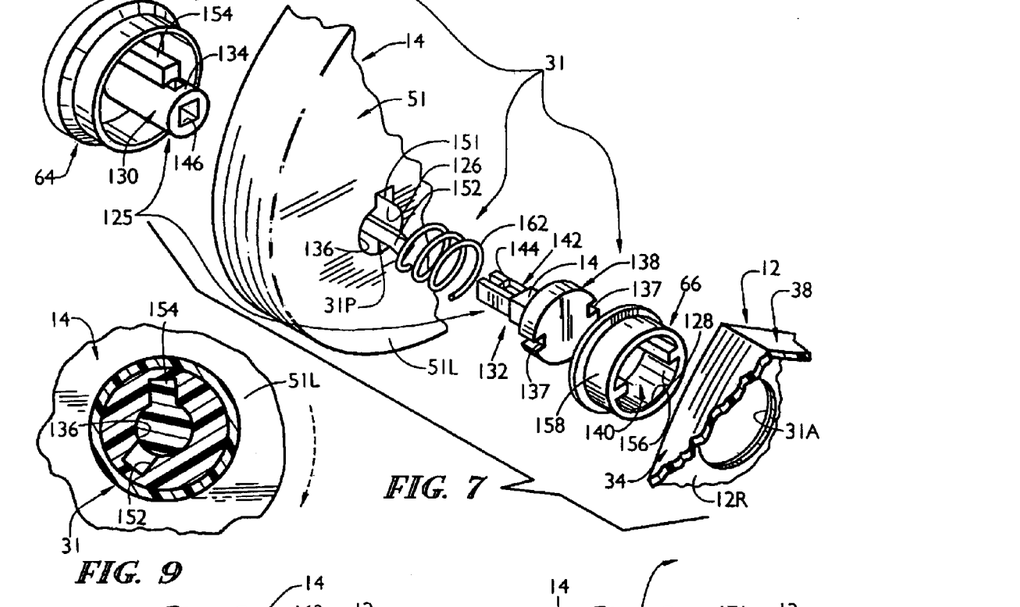
FIG. 7 is an enlarged exploded perspective view of a portion of the juvenile vehicle seat of FIGS. 1-6 showing components included in the first headrest-pivot controller of the headrest folder, which components are similar to components included in the second headrest-pivot controller and to components included in each of the first and second foundation-pivot controllers in the foundation folder.
FIG. 9 is a sectional view taken along line 9-9 of FIG. 8.

Headrest controller 26 includes a first headrest-pivot controller 31 coupled to one side 12R of seat base 12 as suggested in FIGS. 1 and 7 and a second headrest-pivot controller 32 coupled to another side 12L of seat base 12 as suggested in FIGS. 1-3. In illustrative embodiments, first and second headrest-pivot controllers 31, 32 cooperate to establish a headrest axle for supporting headrest 14 for pivotable movement relative to seat base 12 about upper pivot axis 18. Each of controllers 31, 32 is configured to be operated to retain headrest 14 in either the upright use position shown in FIGS. 1 and 4 or the compact folded storage position shown in FIGS. 2 and 5. Illustrative components included in first and second headrest-pivot controllers 31, 32 are shown in FIG. 3.

Foundation controller 28 includes a first foundation-pivot controller 41 coupled to one side of seat base 12 and a second foundation-pivot controller 42 coupled to another side of seat base 12 as suggested in FIGS. 1-3. In illustrative embodiments, first and second foundation-pivot controllers 41, 42 cooperate to establish a foundation axle for supporting foundation 20 for pivotable movement relative to seat base 12 about lower pivot axis 24. Each of controllers 41, 42 is configured to be operated to retain foundation 20 in either the extended use position shown in FIGS. 1 and 4 or the compact folded storage position shown in FIGS. 2 and 5. Illustrative components included in first and second headrest-pivot controllers 41, 42 are shown in FIG. 3.

As suggested in FIG. 3, an illustrative seat base 12 includes a seat bottom 30 and a seat back 34 arranged to extend upwardly from a rear portion of seat bottom 30. In illustrative embodiments, headrest controller 26 is coupled to an upper portion 38 of seat back 34 and foundation controller 28 is coupled to a forward portion 39 of seat bottom 30 as suggested in FIG. 3. A child-restraint harness 40 comprising straps, a buckle, and a harness retainer is coupled to seat bottom 30 and seat back 34 to provide means for temporarily restraining a juvenile (not shown) in a seated position on seat base 12 when juvenile vehicle seat is used in the juvenile-seating mode. Any suitable harness may be used. In illustrative embodiments, seat base 12 is a monolithic component as suggested in FIG. 3.

Upper portion 38 of seat back 34 includes a first side wall 12R formed as suggested in FIG. 3 to include an aperture 31A sized to receive first headrest-pivot controller 31 when controller 31 is mounted on seat back 34 and a second side wall 12L formed as suggested in FIGS. 1-3 to include an aperture 32A sized to receive second headrest-pivot controller 32 when controller 32 is mounted on seat back 34. Upper pivot axis 18 is arranged to extend through apertures 31A, 32A as suggested in FIG. 3.

Forward portion 39 of seat back 34 includes a first side wall 12R formed as suggested in FIG. 3 to include an aperture 41A sized to receive first foundation-pivot controller 41 when controller 41 is mounted on seat back 34 and a second side wall 12L formed as suggested in FIGS. 1-3 to include an aperture 42A sized to receive second foundation-pivot controller 42 when controller 42 is mounted on seat back 34. Lower pivot axis 24 is arranged to extend through apertures 41A, 42A as suggested in FIG. 3.

As suggested in FIG. 3, in an illustrative embodiment, headrest 14 includes first and second side wings 51, 52 arranged to lie in spaced-apart relation to one another and a head support 50 arranged to lie between and to be coupled to first and second side wings 51, 52. Head support 50 provides means for supporting a head of a juvenile seated on seat bottom 30 of seat base 12 when juvenile vehicle seat 10 is configured to assume a juvenile-seating mode.

Side wings 51, 52 are configured to support first and second headrest-pivot controllers 31, 32 of headrest folder 26 as suggested in FIGS. 1 and 3. A first controller-receiving passageway 31P is formed in a lobe 51L of first side wing 51 and a portion of first headrest-pivot controller 31 is arranged to extend through passageway 31P when controller 31 is mounted on first side wing 51 as suggested in FIG. 3. A second controller-receiving passageway 32P is formed in a lobe 52L of second side wing 52 and a portion of second headrest-pivot controller 32 is arranged to extend through passageway 32P when controller 32 is mounted on second side wing 52 as suggested in FIG. 3. As suggested in FIG. 3, head support 50 is coupled to a mount 51M included in first side wing 51 and arranged to interconnect lobe 51L and head support 50. Head support 50 also is coupled to a mount 52M included in second side wing 52 and arranged to interconnect lobe 52L and head support 50.

As suggested in FIG. 3, in an illustrative embodiment, foundation 20 includes first and second thigh supports 61, 62 arranged to lie in spaced-apart relation to one another and a leg rest 60 arranged to lie between and to be coupled to first and second thigh supports 61, 62. Leg rest 60 provides means for supporting legs of a juvenile seated on seat bottom 30 of seat base 12 when juvenile vehicle seat 10 is configured to assume a juvenile-seating mode.

Thigh supports 61, 62 are configured to support first and second foundation-pivot controllers 41, 42 of foundation folder 28 as suggested in FIGS. 1 and 3. A first controller-receiving passageway 41P is formed in a lobe 61L of first thigh support 61 and a portion of first foundation-pivot controller 41 is arranged to extend through passageway 41P when controller 41 is mounted on first thigh support 61 as suggested in FIG. 3. A second controller-receiving passageway 42P is formed in a lobe 62L of second thigh support 62 and a portion of second foundation-pivot controller 42 is arranged to extend through passageway 42P when controller 42 is mounted on second thigh support 62 as suggested in FIG. 3. As suggested in FIG. 3, leg rest 60 is coupled to a mount 61M included in first thigh support 61 and arranged to interconnect lobe 61L and leg rest 60. Leg rest 60 also is coupled to a mount 62M included in second thigh support 62 and arranged to interconnect lobe 62L and leg rest 60. Although in the illustrated embodiment thigh supports 61, 62 extend upwardly above a top surface of leg rest 60 to provide means for supporting thighs of a juvenile seated on seat bottom 30, it is within the scope of the present disclosure to lower the relative height of thigh supports 61, 62 to minimize or eliminate such thigh support means.

In an illustrative embodiment, juvenile vehicle seat 10 further includes a retractable kickstand 11 coupled to seat base 12 for pivotable movement about a kickstand pivot axis 13 as suggested in FIGS. 3-6. It is within the scope of this disclosure to include one or more retractable kickstands 11 in juvenile vehicle seat 10.

As suggested in FIG. 4, in an illustrative embodiment, seat bottom 30 includes a bottom wall 30B and seat back 34 includes a back wall 34B arranged to lie in substantially perpendicular relation to a reference plane including bottom wall 30B. Seat base 12 also includes a positively sloping auxiliary bottom wall 30B' arranged to extend between a rear edge of bottom wall 30B and a lower edge of back wall 34B as suggested in FIGS. 3 and 4. In an illustrative embodiment, bottom walls 30B and 30B' cooperate to define an obtuse included angle 155 of about 155° therebetween as suggested in FIG. 4.

In an upright first juvenile-seating mode, kickstand 11 is pivoted about pivot axis 13 to assume an extended position relative to seat base 12 as suggested in FIG. 4 while headrest 14 and foundation 20 are retained, respectively, in unfolded upright use and extended use positions. In this mode, kickstand 11 cooperates with foundation 20 to support seat back 34 of seat base 12 in a substantially upright position as suggested in FIG. 4.

Figure 6:
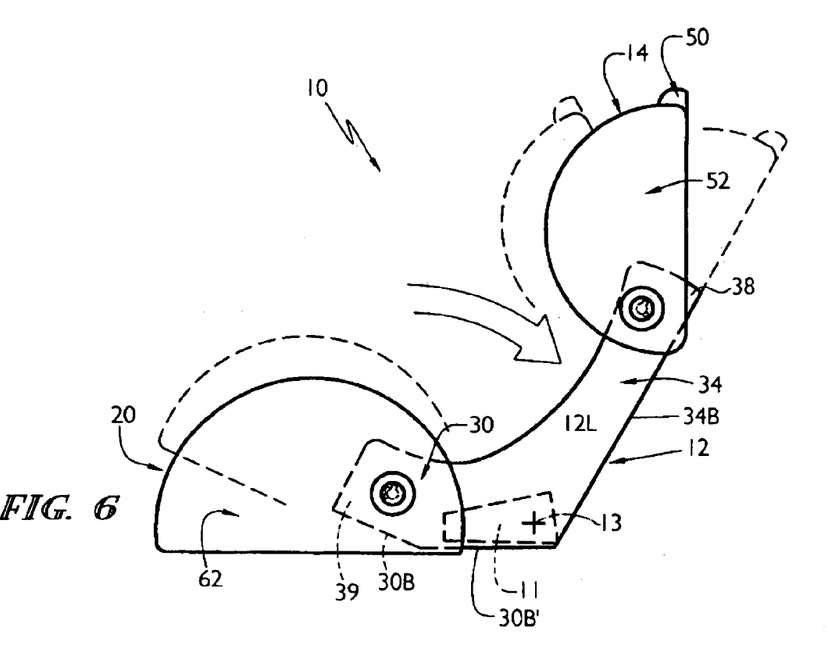
FIG. 6 is a side elevation view of the juvenile vehicle seat of FIGS. 4 and 5 illustrating a reclined second juvenile-seating mode in which the seat base has been rotated about the central horizontal axis in a clockwise direction to assume a reclined position and suggesting that counterclockwise movement of the headrest relative to the seat base about the upper pivot axis is possible at the option of a caregiver to adjust the angular orientation of the headrest providing the head support and also suggesting that clockwise movement of the foundation relative to the seat base about the lower pivot axis is also possible at the option of a caregiver to adjust the angular orientation of the foundation providing the leg rest.

In a reclined second juvenile-seating mode, kickstand 11 is pivoted about kickstand pivot axis 13 to assume a retracted position stored in a kickstand chamber formed in seat base 11 as suggested in FIG. 6 to cause seat back 34 of seat base 11 to be reoriented to assume a reclined position as compared to the upright position shown in FIG. 4. In this reclined second juvenile-seating mode, auxiliary bottom wall 30B' is arranged to contact or lie in closely confronting relation to a seat provided in a vehicle (not shown) and arranged to underlie and carry juvenile vehicle seat 10. It is within the scope of this disclosure to pivot headrest 14 and foundation 20 to assume any suitable new orientations relative to seat base 12 as suggested in FIG. 6 when juvenile vehicles seat 10 is reconfigured to assume the reclined juvenile-seating mode.

In a seat-storing mode, kickstand 11 is pivoted about kickstand pivot axis 13 to assume the retracted position stored in the kickstand chamber formed in seat base 12 as suggested in FIG. 5 while headrest 14 and foundation 20 are retained in their respective compact folded storage positions. Kickstand 11 is thus kept in an out-of-the-way position to enhance compactness of juvenile vehicle seat 10 in the seat-storing mode.

Illustrative components included in first headrest-pivot controller 31 are shown in FIG. 7. Controller 31 includes a pivot rod 125 configured to lie in rotative bearing engagement with a companion cylinder-shaped bearing surface 126 included in lobe 51 of first side wing 51 as suggested in FIGS. 7-10. Pivot rod 125 has a central axis aligned in coextensive relation with upper pivot axis 18 to provide axle means for supporting headrest 14 for pivotable movement about upper pivot axis 18 as headrest 14 is moved between the upright use position shown in FIG. 1 and the compact folded storage position in FIG. 2.

Figure 8:
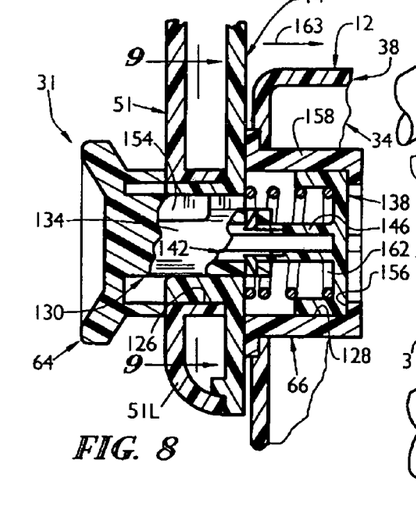
FIG. 8 is an enlarged sectional view taken along line 8-8 of FIG. 1 showing the first headrest-pivot controller in a locked position to retain the headrest in an upright use position relative to the seat base.
Figure 10:
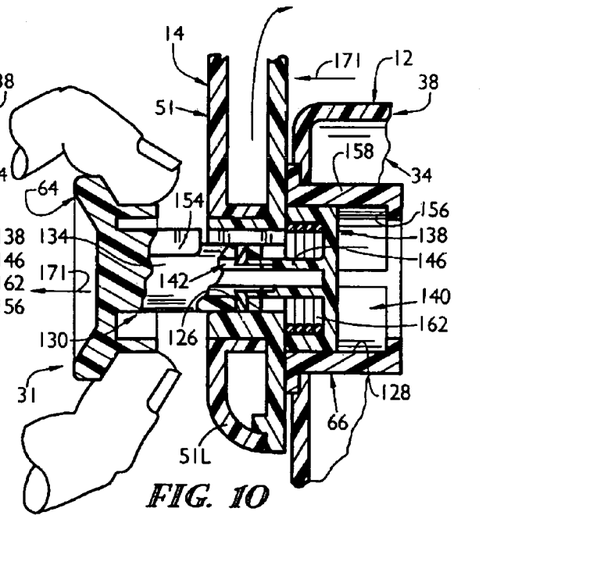
FIG. 10 is a sectional view similar to FIG. 8 showing the first headrest-pivot controller in an unlocked position to free the headrest for pivotable movement about the upper pivot axis in a forward-folding direction from the upright use position shown in FIG. 1 to the compact folded storage position shown in FIG. 2.

First headrest-pivot controller 31 also includes a grip knob 64 coupled to an outer portion of pivot rod 125 and a rod mount 66 configured to extend into first controller-receiving passageway 31P formed in first side wing 51 of headrest 14 as suggested in FIGS. 7, 8, and 10. Rod mount 66 is configured to support portions of pivot rod 125 for sliding movement as suggested in FIGS. 8 and 10. Controller 31 also includes a return spring 162 arranged to wind around pivot rod 125 and interact with first side wing 51 and pivot rod 125 to provide means for normally and yieldably urging the slidable pivot rod 125 and companion grip knob 64 to assume a headrest-locking position mating with first side wing 51 as suggested in FIG. 8 to block pivotable movement of headrest 14 relative to seat base 12 about upper pivot axis 18. A user can pull outwardly in direction 171 on grip knob 64 as suggested in FIG. 10 to cause sliding movement of slidable pivot rod 125 to a headrest-releasing position unmating with first side wing 51 as suggested in FIG. 10 to free headrest 14 for pivotable movement relative to seat base 12 about upper pivot axis 18.

Pivot rod 125 comprises a motion blocker 130 and a blocker mover 132 coupled to motion blocker 130 as suggested, for example, in FIGS. 7 and 8. In an illustrative embodiment, motion blocker 130 includes a cylinder-shaped barrel 134 sized to slide back and forth in a passageway defined by cylinder-shaped bearing surface 126 along a line that is coextensive with upper pivot axis 18. Also, blocker mover 132 includes a guide button 138 sized to slide in passageway 140 defined in rod mount 66 by a cylinder-shaped bearing surface 128 also along upper pivot axis 18 as suggested in FIGS. 7, 8, and 10. Guide button 138 is formed to include at least one lug-receiving slot 137 formed to receive an anti-rotation lug 139 included in rod mount 66 and provided in passageway 140 to block rotation guide button 138 (and all of pivot rod 125) about upper pivot axis 18 during back-and-forth sliding movement of pivot rod 125 in passageways 31P and 140.

As suggested in FIG. 7, blocker mover 132 of pivot rod 125 also includes an elongated barrel mount 142 coupled at one end to guide button 138. A free end 144 of barrel mount 142 extends into a mount receiver 146 formed in barrel 134 as suggested in FIG. 7 and shown in FIGS. 8 and 10. Free end 144 is formed to include means for mating with barrel 134 to retain barrel 134 and barrel mount 142 in fixed relation to one another. A proximal portion 147 of barrel mount 142 interconnects guide button 138 and free end 144 as suggested in FIGS. 7 and 8. In the illustrated embodiment, mount receiver 146 is a channel having a square-shaped opening sized to receive free end 144 configured to have a matching square-shaped cross-section.

First side wing 51 of headrest 14 is formed to include a first headrest pivot controller passageway 31P defined by a passageway 136, a first lug receiver 151 opening into passageway 136, and a second lug receiver 152 opening into passageway 136 as shown, for example, in FIG. 7. First and second lug receivers 151, 152 are located to cooperate to form an angle of about 142° therebetween as suggested, for example, in FIG. 9.

Motion blocker 130 of pivot rod 125 further includes a locking lug 154 coupled to barrel 134 to slide back and forth therewith along upper pivot axis 18 as suggested in FIGS. 7 and 10. Locking lug 154 is arranged to extend radially outwardly away from passageway 146 formed in barrel 134 as suggested in FIG. 7.

Locking lug 154 is sized to fit into each of first lug receiver 151 and second lug receiver 152 as suggested in FIG. 9. Locking lug 154 is arranged and oriented to extend into first lug receiver 151 as shown in FIG. 9 to block pivotable movement of headrest 14 in the upright use position. Locking lug 154 is also arranged and oriented to extend into second lug receiver 152 to block pivotable movement of headrest 14 relative to seat base 12 about upper pivot axis 18 to retain headrest 14 in the compact folded storage position shown in FIG. 2. When locking lug 154 is withdrawn from both of first and second lug receivers 151, 152, then headrest 14 is free to pivot about upper pivot axis 18 relative to seat base 12.

Rod mount 66 is formed to include a radially inwardly extending button stop flange 156 coupled to an outer end of an annular side wall 158 defining a portion of cylinder-shaped bearing surface 128. A return spring 162 is arranged normally to urge blocker mover 132 in axially inner direction 163 as suggested in FIG. 8 to cause guide button 138 to bear against radially inwardly extending button stop flange 156 and to cause locking lug 154 to extend into and remain in either first or second lug receiver 151 152, depending upon whether headrest 14 lies in an upright use position as suggested in FIG. 8 or a compact folded storage position.

In operation, a caregiver can apply an external force in direction 171 to grip knob 64 as suggested in FIG. 10 to cause motion blocker 130 and blocker mover 132 to move outwardly in direction 171. Such outward motion compresses return spring 162 and disengages locking lug 154 from either first or second lug receiver 151, 152. The caregiver is now free to pivot headrest 14 relative to seat base 12 about upper pivot axis 18 to cause headrest 14 to move either to the upright use position shown in FIGS. 1 and 8 or the compact folded storage position shown in FIG. 2. The compressed return spring 162 will expand as soon as headrest 14 arrives at either one of its new use or storage positions to urge locking lug 154 into the lug receiver (151 or 152) associated with the new position to, once again, retain headrest 14 in a fixed position relative to seat base 12.

Illustrative components included in first foundation-pivot controller 41 are shown in FIG. 3 and are the same as the components include in first headrest-pivot controller 31 shown in FIG. 7. The first and second foundation-pivot controllers 41, 42 are similar to one another and to first and second headrest-pivot controllers 31, 32.

Figure 11:
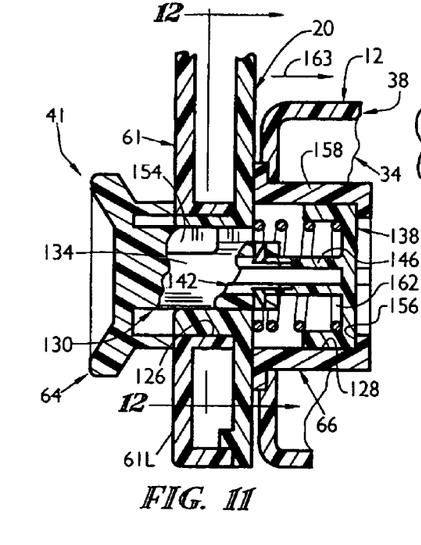
FIG. 11 is an enlarged sectional view taken along line 11-11 of FIG. 1 showing the first foundation-pivot controller in a locked position to retain the foundation providing the leg rest in an extended use position relative to the seat base.
Figure 12:
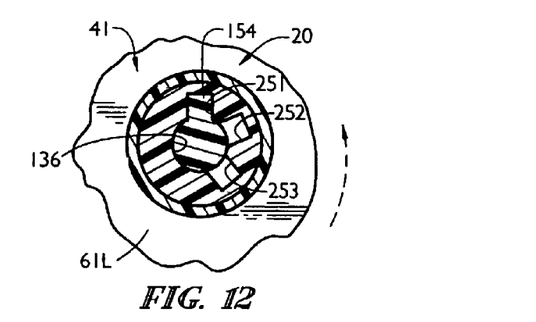
FIG. 12 is a sectional view taken along line 12-12 of FIG. 11.
Figure 13:
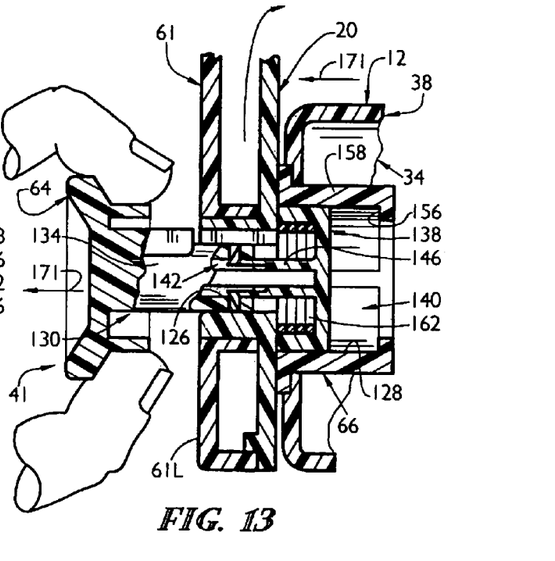
FIG. 13 is a sectional view similar to FIG. 11 showing the first foundation-pivot controller in an unlocked position to free the foundation for pivotable movement about the lower pivot axis in a rearward-folding direction from the extended use position shown in FIG. 1 to the compact folded storage position shown in FIG. 2.

First foundation-pivot controller 41 includes a pivot rod 125 configured to lie in rotative bearing engagement with a companion cylinder-shaped bearing surface 126 included in lobe 61L of first thigh support 61 as suggested in FIGS. 11-13. Pivot rod 125 has a central axis aligned in coextensive relation with lower pivot axis 24 to provide axle means for supporting foundation 20 for pivotable movement about lower pivot axis 24 as foundation 20 is moved between the extended use position shown in FIGS. 1 and 4 and the compact folded storage position in FIG. 2 or between an alternative extended use position shown in FIG. 6 and the compact folded storage position shown in FIG. 2.

First foundation-pivot controller 41 also includes a grip knob 64 coupled to an outer portion of pivot rod 125 and a rod mount 66 configured to extend into first controller-receiving passageway 41P formed in first thigh support 61 of foundation 20 as suggested in FIGS. 11 and 13. Rod mount 66 is configured to support portions of pivot rod 125 for sliding movement as suggested in FIGS. 11 and 13. Controller 41 also includes a return spring 162 arranged to wind around pivot rod 125 and interact with first thigh support 61 and pivot rod 125 to provide means for normally and yieldably urging the slidable pivot rod 125 and companion grip knob 64 to assume a foundation-locking position mating with first thigh support 61 as suggested in FIG. 11 to block pivotable movement of foundation 20 relative to seat base 12 about lower pivot axis 24. A user can pull outwardly in direction 171 on grip knob 64 as suggested in FIG. 13 to cause sliding movement of slidable pivot rod 125 to a headrest-releasing position unmating with first thigh support 61 as suggested in FIG. 13 to free foundation 20 for pivotable movement relative to seat base 12 about lower pivot axis 24.

Pivot rod 125 comprises a motion blocker 130 and a blocker mover 132 coupled to motion blocker 130 as suggested, for example, in FIG. 11. In an illustrative embodiment, motion blocker 130 includes a cylinder-shaped barrel 134 sized to slide back and forth in a passageway defined by cylinder-shaped bearing surface 126 along a line that is coextensive with lower pivot axis 24. Also, blocker mover 132 includes a guide button 138 sized to slide in passageway 140 defined in rod mount 66 by a cylinder-shaped bearing surface 128 also along lower pivot axis 24 as suggested in FIGS. 11 and 13. Guide button 138 is formed to include at least one lug-receiving slot 137 formed to receive an anti-rotation lug 139 included in rod mount 66 and provided in passageway 140 to block rotation guide button 138 (and all of pivot rod 125) about lower pivot axis 24 during back-and-forth sliding movement of pivot rod 125 in passageways 41P and 140.

First thigh support 61 of foundation 20 is formed to include a first foundation-pivot controller passageway 41P defined by a passageway 136, a first lug receiver 251 opening into passageway 136, a second lug receiver 25L opening into passageway 136, and a third lug receiver 253 opening into passageway 136, as shown, for example, in FIGS. 3 and 12. First and second lug receivers 251, 252 are located to cooperate to form an angle of about 53° therebetween and second and third lug receivers 252, 253 are located to cooperate to form an angle of about 104° therebetween.

Motion blocker 130 of pivot rod 125 further includes a locking lug 154 coupled to barrel 134 to slide back and forth therewith along lower pivot axis 24 as suggested in FIGS. 13. Locking lug 154 is arranged to extend radially outwardly away from passageway 146 formed in barrel 134.

Locking lug 154 is sized to fit into each of first lug receiver 251 and second lug receiver 252 and third lug receiver 253 as suggested in FIG. 12. Locking lug 154 is arranged and oriented to extend into first lug receiver 251 as shown in FIGS. 1, 8, and 9 to block pivotable movement of foundation 20 in the extended use position. Locking lug 154 is also arranged and oriented to extend into second lug receiver 252 to block pivotable movement of foundation relative to seat base 12 about lower pivot axis 18 to retain foundation 20 in the alternative extended use position shown in FIG. 6. Also, locking lug 154 is arranged and oriented to extend into third lug receiver 253 to retain foundation 20 in the compact folded storage position shown in FIG. 2. When locking lug 154 is withdrawn from each of first, second, and third lug receivers 251, 252, and 253, then foundation 20 is free to pivot about lower pivot axis 24 relative to seat base 12.

Rod mount 66 is formed to include a radially inwardly extending button stop flange 156 coupled to an outer end of an annular side wall 158 defining a portion of cylinder-shaped bearing surface 128. A return spring 162 is arranged normally to urge blocker mover 132 in axially inner direction 163 as suggested in FIG. 11 to cause guide button 138 to bear against radially inwardly extending button stop flange 156 and to cause locking lug 154 to extend into and remain in either first, second, or third lug receiver 251, 252, or 253, depending upon whether foundation 20 lies in an extended use position as suggested in FIGS. 1, 4, and 11, the alternative extended use position shown in FIG. 6, or a compact folded storage position shown in FIG. 2.

In operation, a caregiver can apply an external force in direction 171 to grip knob 64 as suggested in FIG. 13 to cause motion blocker 130 and blocker mover 132 to move outwardly in direction 171. Such outward motion compresses return spring 162 and disengages locking lug 154 from either first, second, or third lug receiver 251, 252, or 253. The caregiver is now free to pivot foundation 20 relative to seat base 12 about lower pivot axis 24 to cause foundation 20 to move either to the extended use position shown in FIGS. 1, 4, and 11, the alternative extended use position shown in FIG. 6, or the compact folded storage position shown in FIG. 2. The compressed return spring 162 will expand as soon as foundation 20 arrives at either one of its new use or storage positions to urge locking lug 154 into the lug receiver (151 or 152 or 153) associated with the new position to, once again, retain foundation 20 in a fixed position relative to seat base 12.

A caregiver uses headrest folder 26 and foundation folder 28 to reconfigure juvenile vehicle seat 10 between an upright use position (as shown, for example, in FIGS. 1 and 4), a compact folded storage position (as shown, for example, in FIGS. 2 and 5), and a variety of other desired positions (as shown, for example, in FIG. 6). Headrest folder 26 rotates headrest 14 about upper pivot axis 18 relative to seat base 12 and foundation folder 28 rotates foundation 20 about lower pivot axis 24 relative to seat base 12. Headrest folder 26 and foundation folder 28 also lock headrest 14 and foundation 20 relative to seat base 12.

In alternative embodiments of vehicle seat 10, headrest folder 26 and foundation folder 28 have different designs. In one alternative embodiment, first and second headrest-pivot controllers 31 and 32 and first and second foundation-pivot controllers 41 and 42 of foundation folder 28 comprise push or pull latch and notch controllers; ball and detent controllers; screw and tension controllers; slide bolt and hole controllers; or any suitable lock, release, and pivot mechanism.

In another alternative embodiment, headrest folder 26 and foundation folder 28 are configured to employ only a single pivot controller. In one embodiment, the single pivot controller of headrest folder 26 and foundation folder 28 is centrally located on headrest 14 and foundation 20 respectively. Other embodiments include configuration of headrest folder 26 and foundation folder 28 to be operated using a single hand.

Other embodiments of headrest folder 26 and foundation folder 28 allow headrest 14 and foundation 20 to be removed from and again coupled to seat base 12 by the caregiver. The ability to remove and couple headrest 14 and foundation 20 provides the caregiver with additional options for storage and transportation of juvenile vehicle seat 10.

As seen in FIGS. 2 and 5, seat base 12 nests within headrest 14 when in the folded storage position, thereby reducing the overall package size of juvenile vehicle seat 10. First and second side wings 51 and 52 are spaced apart from one another at a distance sufficient to allow seat base 12 to fit between them. As a result, head support 56 of headrest 14 contacts a forward-facing surface of seat back 12 when juvenile vehicle seat 10 is in the compact folded storage position.

Similarly and also as seen in FIGS. 2 and 5, seat base 12 nests within foundation 20 when in the compact folded storage position, thereby further reducing the overall package size of juvenile vehicle seat 10. First and second thigh supports 61 and 62 are spaced apart from one another at a distance sufficient to allow seat base 12 to fit between them. As a result, leg rest 60 of foundation 20 contacts an upward-facing surface of seat bottom 30 when juvenile vehicle seat 10 is in the compact folded storage position. An embodiment illustrated in FIG. 5 shows that headrest 14 nests between first and second thigh supports 61 and 62, even further reducing the overall package size of juvenile vehicle seat 10 when in the compact folded storage position.

It is also within the scope of this disclosure for juvenile vehicle seat 10 to have a more compact design. In one embodiment, first and second side wings 51 and 52 are able to be removed from headrest 14. Similarly, first and second thigh supports 61 and 62 are able to be removed from foundation 20. In this embodiment, headrest folder 26 is designed to interact with head support 50, while foundation folder 28 is designed to interact with leg rest 60.

The invention claimed is:

1. A juvenile vehicle seat comprising
a seat base,
a head platform including a headrest and a headrest axle coupled to the seat base to support the headrest for pivotable movement about an upper pivot axis relative to the seat base between an upright use position extending away from the seat base and a compact folded storage position lying alongside the seat base,
a leg platform including a foundation configured to include a leg rest and a foundation axle coupled to the seat base to support the foundation for pivotable movement about a lower pivot axis relative to the seat base between an extended use position extending away from the seat base and a compact folded storage position lying alongside the seat base; and
wherein the seat base is generally L-shaped and includes a generally horizontal seat bottom and a generally vertical seat back arranged to extend upwardly from a rear portion of seat bottom, the headrest axle is coupled to an upper portion of the seat back, and the foundation is coupled to a forward portion of the seat bottom.

2. The juvenile vehicle seat of claim 1, wherein the headrest axle is established by a first headrest-pivot controller coupled to the headrest and to one side of the seat base and a second headrest-pivot controller coupled to the headrest and to another side of the seat base.

3. The juvenile vehicle seat of claim 2, wherein the upper pivot axis is arranged to extend through each of the first and second headrest-pivot controllers.

4. The juvenile vehicle seat of claim 2, wherein the first headrest-pivot controller is configured to provide headrest-lock means for temporarily retaining the headrest in fixed relation to the seat base in each of the upright use positions and the compact folded storage position.

5. The juvenile vehicle seat of claim 1, wherein the seat base includes a seat bottom and a seat back arranged to extend upwardly from a rear portion of seat bottom, the headrest axle is coupled to an upper portion of the seat back, and the foundation is coupled to a forward portion of the seat bottom.

6. The juvenile vehicle seat of claim 5, further comprising a child-restraint harness coupled to the seat bottom and the seat back and separated from the headrest and from the foundation and the child-restraint harness is configured to restrain temporarily a juvenile seated on the seat base when the headrest has been moved to assume the upright use position and the foundation has been moved to assume the extended use position.

7. The juvenile vehicle seat of claim 1, wherein the foundation axle is established by a first foundation-pivot controller coupled to the foundation and to one side of the seat base and a second foundation-pivot controller coupled to the foundation and to another side of the seat base.

8. The juvenile vehicle seat of claim 7, wherein the lower pivot axis is arranged to extend through each of the first and second foundation-pivot controllers.

9. The juvenile vehicle seat of claim 7, wherein the first foundation-pivot controller is configured to provide foundation-lock means for temporarily retaining the foundation in fixed relation to the seat base in each of the extended use position and the compact folded storage position.

10. The juvenile vehicle seat of claim 7, wherein the first foundation-pivot controller is configured to provide foundation-lock means for temporarily retaining the foundation in each of the extended use position, the compact folded storage position, and an alternative extended use position located between the extended use and compact folded storage positions.

11. A juvenile vehicle seat comprising
a seat base,
a foldable headrest mounted on a headrest controller coupled to the seat base for folding movement in a counterclockwise forward direction about an upper pivot axis relative to the seat base from an upright use position extending away from the seat base to a compact folded storage position arranged to lie alongside a generally vertical seat back included in the seat base, and
a foldable foundation mounted on a foundation controller coupled to the seat base for folding movement in a clockwise rearward direction about a lower pivot axis relative to the seat base from an extended use position extending away from the seat base to a compact folded storage position arranged to lie alongside a generally horizontal seat bottom included in the seat base and in closely confronting relation to the foldable headrest upon movement of the foldable headrest to assume the compact folded storage position.

12. The juvenile vehicle seat of claim 11, wherein the seat back of the seat base includes a forward-facing surface adapted to support a juvenile seated on the seat bottom and a head support included in the foldable headrest is positioned to face toward and lie in closely confronting relation to the forward-facing surface of the seat back upon movement of the foldable headrest to assume the compact folded storage position.

13. The juvenile vehicle seat of claim 12, wherein the foldable head rest further includes first and second side wings arranged to lie in spaced-apart relation to one another to locate the head support therebetween and the seat back of the seat base is arranged to extend into and nest within a back-receiving space bounded by the head support and the first and second side wings upon movement of the foldable headrest to assume the compact folded storage position.

14. The juvenile vehicle seat of claim 13, wherein the headrest controller is coupled to the first and second side wings.

15. The juvenile vehicle seat of claim 11, wherein the seat bottom of the seat base includes an upward-facing surface adapted to lie under and support a juvenile seated on the seat bottom and a leg rest included in the foldable foundation is positioned to face toward and lie in closely confronting relation to the upward-facing surface of the seat bottom upon movement of the foldable foundation to assume the compact folded storage position.

16. The juvenile vehicle seat of claim 15, wherein the seat back of the seat base includes a forward-facing surface adapted to support a juvenile seated on the seat bottom and a head support included in the foldable headrest is positioned to face toward and lie in closely confronting relation to the forward-facing surface of the seat back upon movement of the foldable headrest to assume the compact folded storage position.

17. The juvenile vehicle seat of claim 15, wherein the foldable foundation further includes first and second thigh supports arranged to lie in spaced-apart relation to one another to locate the leg rest therebetween and the seat bottom of the seat base is arranged to extend into and nest with a bottom-receiving space bounded by the leg rest and the first and second thigh supports upon movement of the foldable foundation to assume the compact folded storage position.

18. The juvenile vehicle seat of claim 17, wherein the foundation controller is coupled to the first and second thigh supports.

19. The juvenile vehicle seat of claim 11, further comprising a retractable kickstand coupled to the seat base for pivotable movement about a kickstand pivot axis between an extended position extending away from the seat base and a retracted position lying alongside the seat base and wherein,
in an upright first juvenile-seating mode, the kickstand is pivoted to assume the extended position while the headrest is retained in the upright use position and the foundation is retained in the extended use position,
in a seat-storing mode, the kickstand is pivoted to assume the retracted position while the headrest and the foundation are retained in the compact folded storage positions, and
in a reclined second juvenile-seating mode, the kickstand is pivoted to assume the retracted position while the headrest is retained in the extended use position and the foundation is retained in an alternative extended use position that is different than the extended use position.

* * * * *